United States Patent [19]
Hoffmann

[11] Patent Number: 5,118,205
[45] Date of Patent: Jun. 2, 1992

[54] BEARING UNIT FOR A BOTTOM BRACKET BEARING OF A BICYCLE OR THE LIKE

[75] Inventor: Joachim Hoffmann, Nöhstrasse 16, D-5800 Hagen, Fed. Rep. of Germany

[73] Assignee: Joachim Hoffmann, Hagen, Fed. Rep. of Germany

[21] Appl. No.: 621,789

[22] Filed: Dec. 4, 1990

[30] Foreign Application Priority Data

Dec. 6, 1989 [DE] Fed. Rep. of Germany ....... 3940274

[51] Int. Cl.⁵ ..................... F16C 9/02; F16C 19/08
[52] U.S. Cl. .................... 384/458; 384/492; 384/512; 384/545
[58] Field of Search ........... 384/458, 456, 457, 431, 384/492, 510, 512, 544, 545; 74/594.1

[56] References Cited

U.S. PATENT DOCUMENTS

| | | | |
|---|---|---|---|
| 3,105,725 | 10/1963 | Biesecker | 384/492 |
| 3,224,821 | 12/1965 | Barr | 384/484 |
| 4,606,655 | 8/1986 | Hofman | 384/458 |
| 4,606,657 | 8/1986 | Tanaka | 384/492 |
| 4,606,658 | 8/1986 | Hofmann et al. | 384/458 X |
| 4,611,933 | 9/1986 | Hofmann et al. | 384/458 X |
| 4,651,590 | 3/1987 | Thun | 384/458 X |

FOREIGN PATENT DOCUMENTS

| | | |
|---|---|---|
| 3407120A1 | 9/1984 | Fed. Rep. of Germany . |
| 3434314A1 | 3/1986 | Fed. Rep. of Germany . |
| 575792 | 4/1924 | France . |
| 2135399 | 8/1984 | United Kingdom ........ 384/458 |

Primary Examiner—Thomas R. Hannon
Attorney, Agent, or Firm—Herbert Dubno

[57] ABSTRACT

A bottom bracket bearing unit for a bicycle or the like has an installation unit formed by a long sleeve and short sleeve of synthetic resin formed directly with race grooves for a pair of double bearings which have steel balls riding between the grooves of the sleeves and the grooves of the pedal-crnak axle or shaft which is received in these sleeves.

4 Claims, 2 Drawing Sheets

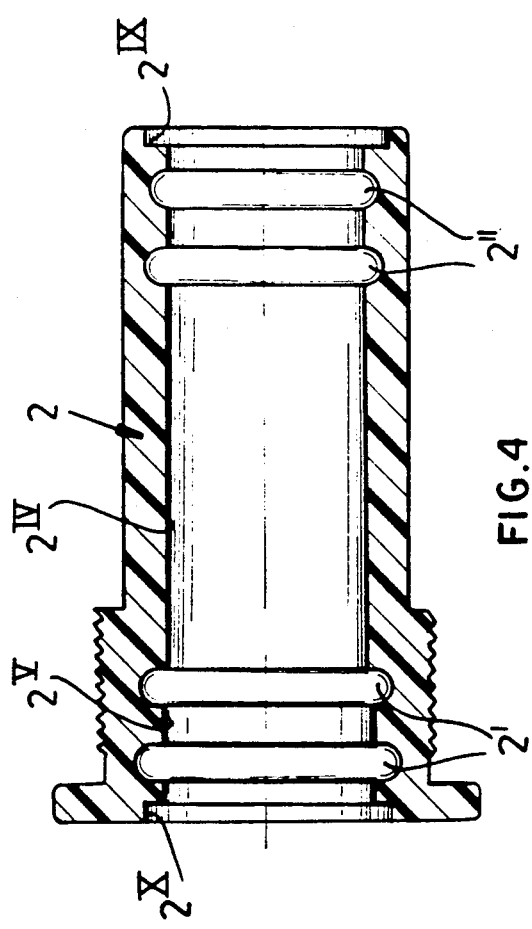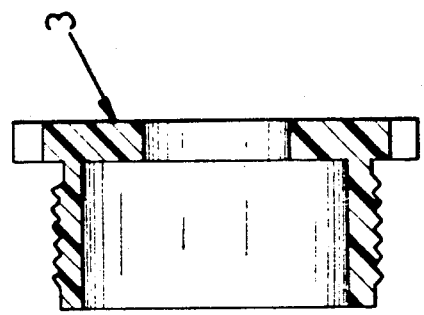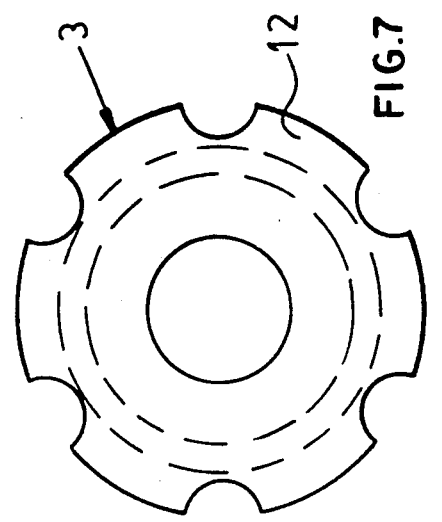

BEARING UNIT FOR A BOTTOM BRACKET BEARING OF A BICYCLE OR THE LIKE

FIELD OF THE INVENTION

My present invention relates to a bottom bracket bearing unit, i.e. a bearing unit which is receivable in the bottom bracket or housing for the crank axle of a bicycle or the like and to the bottom bracket assembly including the bearing unit, the axle for the crank arms and the bearing elements of the latter which journal the axle in the bottom bracket.

BACKGROUND OF THE INVENTION

It is known to provide a bottom bracket bearing arrangement for journaling an axle carrying the crank arms to which, in turn, respective pedals are pivotally connected for a bicycle.

In general, steel bearing balls serve to journal the axle in a bearing sleeve which can be accommodated in the bottom bearing bracket.

Bottom bracket bearing units of the aforedescribed type are described in German open application DE-OS 34 07 120 and DE-OS 34 34 314. Such systems permit simple assembly of the bottom bracket bearing unit in the bottom bracket of the bicycle frame since the entire bearing structure can be received in the installation sleeve which fits into the housing of the bottom bracket. The mounting operation merely involves connecting the two parts of the installation sleeve in the bottom bracket.

The installation sleeve may comprise a long sleeve member flanged at one end and engaging at its other end, e.g. received within a short flanged sleeve with the flanges of the two sleeves bearing upon opposite axle ends of the receiving housing of the bottom bracket. In general, at each end of the installation housing, a crown of bearing balls is provided which ride upon metallic and, generally, steel bearing shells or races which, as a rule, have a quarter circular arcuate ring profile.

The installation and mounting of such ball bearings and the respective races involve considerable expense and effort.

The same holds true for other known bottom bracket bearings in which the balls form circular rows of ball bearings which ride in races formed as grooves in the shaft or axle and in cylindrical bearing shells or races fitted into or embedded in the plastic or synthetic resin installation sleeves.

OBJECTS OF THE INVENTION

It is, therefore, the principal object of the present invention to provide a bottom bracket bearing unit of the general type described in which, however, the aforementioned disadvantages are avoided.

Another object of the invention is to provide a bottom bracket bearing unit which can be installed more simply and more easily in the bearing bracket housing, can withstand greater stresses and is longer wearing than earlier units and which can be fabricated economically and at low cost.

SUMMARY OF THE INVENTION

These objects and others which will become more readily apparent hereinafter are attained, in accordance with the present invention, by having the bearing balls ride directly in grooves or races formed in the synthetic resin installation sleeves, i.e. directly in contact with the plastic thereof and by providing two pairs of such bearing crowns each with a respective pair of race grooves formed directly in the installation sleeve so that double ball bearings are formed at each end of the installation sleeves.

In this manner I am able to form a bottom bracket bearing unit which completely eliminates the need for bearing shells received in or embedded in the installation sleeve, to simplify the fabrication of the bearing unit, and nevertheless enable it to withstand substantially greater stresses than have hitherto been the case. By providing pairs of ball bearings at each end of the assembly, I am able to so distribute the forces that the bearing balls can ride directly against the plastic of the installation sleeve without problems.

More specifically, the invention is a bottom bracket bearing unit receivable in a pedal-crank axle housing of a bicycle or the like and which comprises:

a long sleeve composed of a synthetic resin and formed with a flange at one end;

a short sleeve composed of a synthetic resin, interfitting with an opposite end of the long sleeve and formed with a flange, at least one of the sleeves being formed internally with a plurality of axially spaced inwardly open grooves defining respective outer bearing races, the grooves being provided in two pairs of closely spaced grooves respectively located proximal to each of the ends of the long sleeve and having a spacing between the pairs which is greater than a spacing of the grooves of each pair from one another;

a crank axle received in the sleeves and having opposite axial ends projecting outwardly from the sleeves, the crank axle being composed of metal and having a respective outwardly open groove extending circumferentially around the crank axle and opening toward and registering with a respective one of the grooves of the sleeves to form another inner bearing race therewith; and bearing balls received in the registering bearing races of the sleeve and the crank axle and rolling in direct contact with the synthetic resin of at least one of the sleeves, the bearing balls of each of the pairs together with the respective races forming a respective double ball bearing journeying the crank axle in the sleeves.

In French patent 575,792, a bottom bracket bearing is described in which the pedal-crank axle is journaled at both ends in the bearing housing by means of double ball bearings. However, in this system as well as those described, special races are provided for the bearing balls so that the bearing balls do not directly contact synthetic resin or plastic sleeves. A plastic installation housing for the direct support of the bearing balls is not provided in this case.

U.S. Pat. No. 3,224,821 describes bearing balls which ride directly in plastic bearing sleeves. These systems, however, relate to single ball bearing arrangements as used in low-load conveyer rollers. Furthermore, the bearing balls here are also composed of plastic. For bicycle bottom bracket bearing units, plastic bearing balls are totally unsatisfactory.

According to a feature of the invention, each pair of bearings is constituted of bearings of different diameters and the balls of the two bearings thus ride in race grooves which also are of different diameters for each pair, the diameters decreasing from the insertion end of the sleeves to the opposite end of the sleeves, i.e. from the end of the sleeve through which the axle or shaft is inserted, to the opposite end of the sleeve.

It has been found to be advantageous, moreover, to provide the long sleeve with all four outer bearing ball grooves in a simply stepped cylindrical inner bore with the steps being largest at the insertion end of the sleeve. The axle or shaft can, in turn, be stepped, and preferably has two steps with a cylindrical portion between them. In this construction, the cylindrical middle region can be flanked by two frustoconically-shaped transition regions running to the bearing race grooves of different diameters whereby ahead of each groove in the insertion direction, there is disposed a frustoconical ball pressing zone.

A bottom bracket bearing unit of this type can be constructed most simply.

Advantageously, the bottom bracket bearing unit of the invention is assembled by turning the installation sleeve assembly consisting of the long and short sleeves or only the long sleeve where all four bearings are provided in this long sleeve, on end, and then inserting the shaft or axle from below.

The balls are filled into the race groove of the long sleeve proximal to the insertion end first and then with progressive movement of the axle or shaft upwardly into the next groove and then the next two grooves in succession in numbers of balls corresponding to the circumferences until all of the grooves are filled with the balls and the frustoconical surfaces of the axle or shaft are pressed against the balls. Then an additional pressing force is applied to allow the balls to snap into the grooves formed in the axle or shaft.

As an alternative to this method of assembly, I can combine the balls with an adhesive grease which is used to hole the balls in the respective grooves of the insertion sleeve until the axle or shaft is inserted and pressed into its final position.

As the axle or shaft is pressed into the final position, sealing rings, disks or washers at each end of the installation sleeve can snap into respective grooves on the axle or shaft.

BRIEF DESCRIPTION OF THE DRAWING

The above and other objects, features and advantages of the present invention will become more readily apparent from the following description, reference being made to the accompanying drawing in which:

FIG. 4 is an axle cross sectional view through the long sleeve;

FIG. 5 is an axle cross sectional view through the short sleeve;

FIG. 6 is an end view of the long sleeve; and

FIG. 7 is an end view of the short sleeve.

SPECIFIC DESCRIPTION

Figure 1:
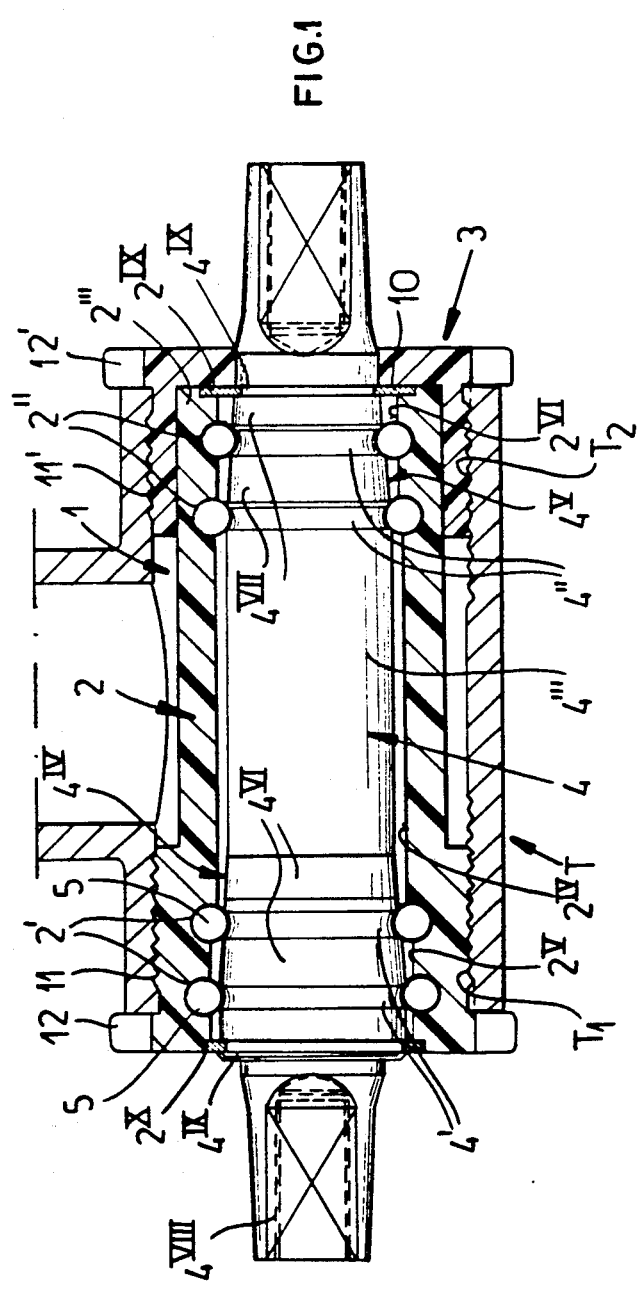
FIG. 1 is an axle cross sectional view through a bottom bracket bearing unit according to the invention in place in the bottom bracket housing.
Figure 2:
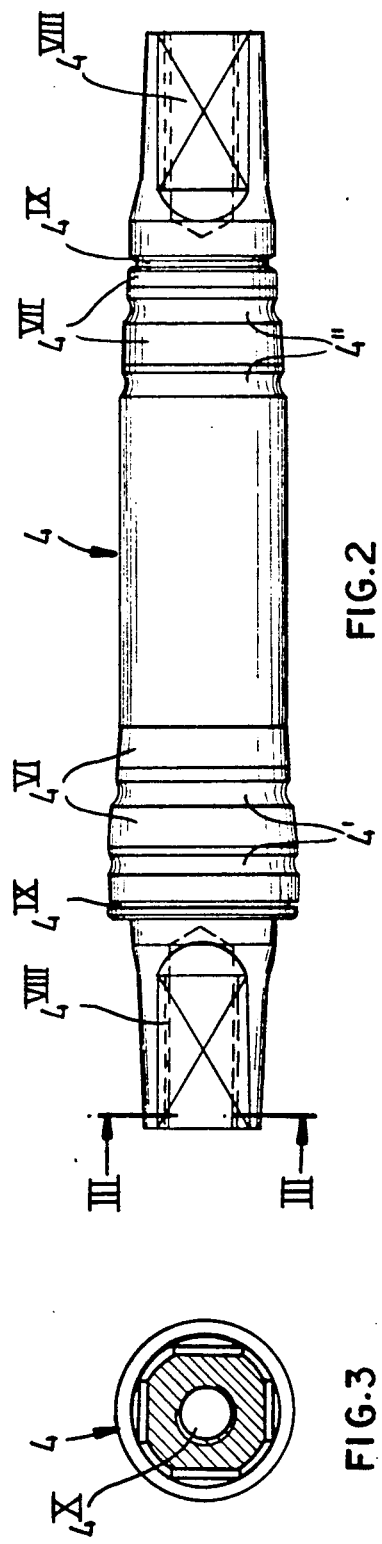
FIG. 2 is a side elevational view of the shaft or axle.
Figure 3:
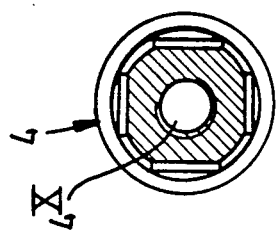
FIG. 3 is a cross sectional view taken along the line III—III of FIG. 2.

The bottom bracket bearing unit shown in FIG. 1 in place within the housing T for the bottom bracket, comprises an installation housing consisting of a relatively long sleeve 2 and a relatively short sleeve 3, both of these sleeves being flanged at their ends. For positioning of the installation housing 1 within the housing T, the housing T is provided with internal threads $T_1$ and $T_2$ at its opposite ends into which the threaded boss 11 of the long sleeve 2 and the external thread 11 of the short sleeve 3 can be screwed. In practice, once axle or shaft 4 has been assembled together with the bearings 5 and the long sleeve 2, the long sleeve is inserted into the left-hand end of the housing T until its flange comes to rest against the left-hand end. The long sleeve is locked in place by screwing the short sleeve 3 into the opposite end until its flange comes to abut the right-hand end of the housing T of the bicycle or a like structure.

Both flanged sleeves 2 and 3 are composed of a synthetic resin or plastic, for example, an injection-molded polyamide.

The crank shaft or axle 4 extends centrally through the installation housing 1 and is journaled therein proximal to the ends of the housing in double bearings 5 at each end.

For this purpose, at each end of the flanged sleeve 2 and within the latter, two bearing race grooves $2'$ and $2''$ are provided directly in the plastic material of the sleeve and in juxtaposition with two bearing race grooves $4'$, $4''$ formed directly in the metal of the shaft or axle. Steel bearing balls 5 are received in the juxtaposed grooves to form the double ball bearing at each end as described. On either outer sides, therefore, the bearing balls ride directly on the plastic of the sleeves while on their inner sides, the balls ride directly on the metal of the respective axle or shaft.

Each pair of outer bearing race grooves 2, $2'$ of the housing and the juxtaposed inner race grooves, 4, $4'$ of the shaft 4 form ball bearings of different diameters, the diameters being stepped downwardly from the shaft insertion end 6 of the long flanged sleeve 2 to the end carrying the short flanged sleeve 3.

The long flanged sleeve 2 is formed internally with a simple stepped cylindrical bore 2 which has a large diameter step $2^I$ in which the larger diameter grooves $2'$ are formed and which also serve as the insertion opening at the insertion opening end 6.

The smaller diameter grooves $2''$ are formed in a smaller diameter step $2^{II}$ at the opposite axle end.

By contrast, the crank shaft 4 has two steps at each of its bearing regions and comprises a cylindrical central portion $4'''$ flanked by two substantially frustoconical transition regions $4^{II'}$ and $4^{V'}$ for the race grooves $4'$ and $4''$. As a consequence, each race groove $4'$, $4''$ has a conical ball pressing zone $4^{VI}$ or $4^{VII}$ located ahead of it.

The ends of the shaft or axle 4 in the usual manner are formed as slightly tapered square-cross section stubs $4^{VIII}$ with threaded internal bores $4^X$ to accommodate the screw which will secure the pedal onto the stub $4^{VIII}$.

Both end faces of the long sleeve 2 are provided with grooves $2^{IX}$ and $2^X$ in which sleeve rings, disks or washers are received and which can bring into the grooves $4^{IX}$ of the shaft or axle 4 when the latter is forced fully into place within the installation housing 1.

For assembly of the bottom bracket bearing unit, the sleeve 2 can be turned on end with the large shaft-receiving opening 6 turning downwardly. The shaft 4 can be inserted upwardly through this opening in steps with increments of such insertion corresponding substantially to the axial spacing of the bearing grooves, $4'$, $4''$.

Associated with this stepwise upward insertion of the shaft 4 in the sleeve 2 is a filling of the successively higher grooves $2'$, $2''$ with corresponding numbers of the steel bearing balls 5 so that the largest diameter groove 2' is filled first, then the next smaller diameter bearing groove 2', etc., until all of the grooves of the sleeve 2 are filled. At this point, a frustoconical ball pressing zone $4^{VI}$ or $4^{VII}$ lies ahead of each array of balls and a final thrust of the shaft 4 into the sleeve 2 will cause the balls to jump into the grooves 4, 4' and the washers or disks 9 and 10 to spring into the grooves $4^{IX}$. The disks 9 and 10 thus seal the interior of the housing 1 from contamination.

The sleeve 2 is then screwed into the housing T or can be force-fitted therein by pressing.

The sleeve 3 can then be screwed into the housing T from the other end to lock the sleeve 22 in place. For the threaded rotation of the sleeves 2 and 3, the flanges 12, 12' can be formed with notches engageable by an appropriate spanner. In setting of the short sleeve 3, the unthreaded end of the sleeve 2 is engaged in the sleeve 3.

I claim:

1. A bottom bracket bearing unit receivable in a pedal-crank axle housing of a bicycle or the like, said bottom bracket bearing unit comprising:
   a long sleeve composed of a synthetic resin and formed with a flange at one end;
   a short sleeve composed of a synthetic resin, interfitting with an opposite end of said long sleeve and formed with a flange, said long sleeve being formed internally with a plurality of axially spaced inwardly open grooves defining respective outer bearing races, said grooves being provided in two pairs of closely spaced grooves respectively located proximal to each of said ends of said long sleeve and having a spacing between said pairs which is greater than a spacing of the grooves of each pair from one another;
   a crank axle received in said sleeves and having opposite axial ends projecting outwardly from said sleeves, said crank axle being composed of metal and having a respective outwardly open groove extending circumferentially around the crank axle and opening toward and registering with a respective one of said grooves of said sleeves to form another inner bearing race therewith; and
   bearing balls received in the registering bearing races of said sleeve and said crank axle and rolling in direct contact with the synthetic resin of said long sleeve, the bearing balls of each of said pairs together with the respective races forming a respective double ball bearing journalling said crank axle in said sleeves.

2. The bottom bracket bearing unit defined in claim 1 wherein all four of said grooves defining said outer bearing races are formed in said long sleeve.

3. The bottom bracket bearing unit defined in claim 1 wherein the races spaced apart axially along said axle and said sleeves have different diameters stepped downwardly from said one end of said long sleeve to the end of said short sleeve formed with said flange of said short sleeve.

4. The bottom bracket bearing unit defined in claim 3 wherein said long sleeve has a stepped inner bore with a large-diameter insertion end through which said axle is inserted into said long sleeve, said large-diameter insertion end being formed with the race of largest diameter formed in said long sleeve and said axle is formed with a central cylindrical portion flanked by frustoconical portions tapering in an insertion direction and forming ball-pressing surfaces, said frustoconical portions lying between races of different diameter of said axle.

* * * * *